(12) United States Patent
Nawa et al.

(10) Patent No.: US 6,725,878 B1
(45) Date of Patent: Apr. 27, 2004

(54) GAS LEAK DETECTION SYSTEM

(75) Inventors: Motoyuki Nawa, Ikoma (JP); Shigeru Iwanaga, Nara (JP); Mitsuo Nanba, Machida (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/786,939

(22) PCT Filed: Sep. 10, 1999

(86) PCT No.: PCT/JP99/04973
§ 371 (c)(1),
(2), (4) Date: Aug. 1, 2001

(87) PCT Pub. No.: WO00/16059
PCT Pub. Date: Mar. 23, 2000

(30) Foreign Application Priority Data

Sep. 11, 1998 (JP) .......................... 10-258138

(51) Int. Cl.[7] ............................. G01M 3/28
(52) U.S. Cl. .............. 137/487.5; 137/312; 137/486; 137/557; 137/613; 48/193; 73/861.27; 340/605; 702/51
(58) Field of Search .............. 137/312, 486, 137/487.5, 557, 613; 48/193; 73/40.5 R, 49.1, 861.27; 340/605; 702/51; 251/129.05, 129.08

(56) References Cited

U.S. PATENT DOCUMENTS

| | | | | |
|---|---|---|---|---|
| 3,624,627 A | * | 11/1971 | Evans | ..................... 137/557 |
| 3,664,357 A | * | 5/1972 | Kreiss | ........................ 137/2 |
| 3,962,905 A | * | 6/1976 | Jouve | .................. 73/40.5 R |
| 4,066,095 A | * | 1/1978 | Massa | ..................... 137/486 |
| 4,518,955 A | * | 5/1985 | Meyer | ..................... 340/605 |
| 4,705,060 A | * | 11/1987 | Goulbourne | ............... 137/102 |
| 4,866,633 A | * | 9/1989 | Nakane et al. | ............. 700/282 |
| 5,046,519 A | * | 9/1991 | Stenstrom et al. | ........... 137/1 |
| 5,056,554 A | * | 10/1991 | White | ..................... 137/486 |
| 5,126,934 A | * | 6/1992 | MacFadyen | ................ 700/11 |
| 5,554,976 A | * | 9/1996 | Miyauchi et al. | .......... 340/626 |
| 5,866,802 A | * | 2/1999 | Kimata et al. | .......... 73/40.5 R |
| 6,167,749 B1 | * | 1/2001 | Yanagisawa et al. | .... 73/40.5 R |
| 6,457,483 B1 | * | 10/2002 | Uhrig | ..................... 137/15.11 |

FOREIGN PATENT DOCUMENTS

| | | |
|---|---|---|
| JP | 7198688 | 8/1995 |
| JP | 08-297068 | 11/1996 |
| JP | 08-313322 | 11/1996 |
| JP | 09-061283 | 3/1997 |

* cited by examiner

Primary Examiner—John Rivell
Assistant Examiner—Ramesh Krishnamurthy
(74) Attorney, Agent, or Firm—Snell & Wilmer, LLP

(57) ABSTRACT

A gas leakage detection system includes a flow path, a dual mode valve disposed in the flow path, an ultrasonic measuring section including a pair of ultrasonic transducers, disposed in the flow path upstream from the dual mode valve, a flow rate calculation section for computing a flow rate based on a signal from the ultrasonic measuring section, and a control section for controlling the dual mode valve. The control section closes or opens the dual mode valve instantaneously, and the flow rate calculation section computes a flow rate when the dual mode valve is closed. Thus, gas leakage can be decided substantially without stopping a gas flow when a user is using the gas.

11 Claims, 17 Drawing Sheets

GAS LEAK DETECTION SYSTEM

TECHNICAL FIELD

The present invention relates to a gas leakage detection system for detecting leakage of gas piping.

BACKGROUND ART

Conventionally, a system for detecting leakage of gas piping by using an instantaneous flow meter has been known. Such a system is described in, for example, Japanese Laid-Open Publication No. 7-126021.

FIG. 1 shows a structure of a conventional system described in Japanese Laid-Open Publication No. 7-126021. The system includes flow rate detection means 1 disposed in a common piping 4, a shut-off valve 2 disposed in an individual piping 5, and a shut-off valve 3 disposed in an individual piping 6.

In the conventional system shown in FIG. 1, it is investigated whether or not gas is leaking downstream from the flow detection means 1 by using the flow detection means 1 disposed in the common piping 4 under the condition that the individual piping 5 is shut-off by the shut-off valve 2 and the individual piping 6 is shut-off by the shut-off valve 3.

However, the above-mentioned conventional system is required to decide whether or not gas is leaking under the condition that a gas flow is stopped by the shut-off valves 2 and 3. Therefore, in the case where a user is utilizing gas, it cannot be decided whether or not gas is leaking.

DISCLOSURE OF THE INVENTION

A gas leakage detection system of the present invention, includes: a flow path; a dual mode valve disposed in the flow path; an ultrasonic measuring section including a pair of ultrasonic transducers, disposed in the flow path upstream from the dual mode valve; a flow rate calculation section for computing a flow rate based on a signal from the ultrasonic measuring section; and a control section for controlling the dual mode valve, wherein the control section closes or opens the dual mode valve instantaneously, and the flow rate calculation section computes a flow rate when the dual mode valve is closed.

Because of the above-mentioned structure, gas leakage can be detected substantially without affecting the use of gas by a user. As a result, a leakage detection system with satisfactory convenience can be provided.

A gas leakage detection system of the present invention includes a flow path and a plurality of leakage decision blocks disposed in the flow path, wherein each of the plurality of leakage decision blocks includes: a dual mode valve disposed in the flow path; an ultrasonic measuring section including a pair of ultrasonic transducers, disposed in the flow path upstream from the dual mode valve; a flow rate calculation section for computing a flow rate based on a signal from the ultrasonic measuring section; and a control section for controlling the dual mode valve, wherein the control section in each of the plurality of leakage decision blocks closes or opens the dual mode valve instantaneously from an upstream side to a downstream side of the flow path, and the flow rate calculation section computes a flow rate when the dual mode valve is closed.

Because of the above-mentioned structure, gas leakage can be detected substantially without affecting the use of gas by a user. As a result, a leakage detection system with satisfactory convenience with respect to a piping system can be provided.

A gas leakage detection system of the present invention includes a flow path and a plurality of leakage decision blocks disposed in the flow path, wherein each of the plurality of leakage decision blocks includes: a dual mode valve disposed in the flow path; an ultrasonic measuring section including a pair of ultrasonic transducers, disposed in the flow path upstream from the dual mode valve; a flow rate calculation section for computing a flow rate based on a signal from the ultrasonic measuring section; and a control section for controlling the dual mode valve, wherein the control section in each of the plurality of leakage decision blocks closes or opens the dual mode valve instantaneously from a downstream side to an upstream side of the flow path, and the flow rate calculation section computes a flow rate when the dual mode valve is closed.

Because of the above-mentioned structure, gas leakage can be detected substantially without affecting the use of gas by a user. As a result, a leakage detection system with satisfactory convenience with respect to a piping system can be provided.

A gas leakage detection system of the present invention, includes: a flow path; a dual mode valve disposed in the flow path; a pressure sensor disposed in the flow path upstream from the dual mode valve; a pressure calculation section for computing a pressure based on a signal from the pressure sensor; and a control section for controlling the dual mode valve, wherein the control section closes or opens the dual mode valve instantaneously, and the pressure calculation section computes a pressure when the dual mode valve is closed.

Because of the above-mentioned structure, gas leakage can be detected substantially without affecting the use of gas by a user. As a result, a leakage detection system with satisfactory convenience can be provided.

A gas leakage detection system of the present invention includes a flow path and a plurality of leakage decision blocks disposed in the flow path, wherein each of the plurality of leakage decision blocks includes: a dual mode valve disposed in the flow path; a pressure sensor disposed in the flow path upstream from the dual mode valve; a pressure calculation section for computing a pressure based on a signal from the pressure sensor; and a control section for controlling the dual mode valve, wherein the control section in each of the plurality of leakage decision blocks closes or opens the dual mode valve instantaneously from an upstream side to a downstream side of the flow path, and the pressure calculation section computes a pressure when the dual mode valve is closed.

Because of the above-mentioned structure, gas leakage can be detected substantially without affecting the use of gas by user. As a result, a leakage detection system with satisfactory convenience with respect to a piping system can be provided.

A gas leakage detection system of the present invention includes a flow path and a plurality of leakage decision blocks disposed in the flow path, wherein each of the plurality of leakage decision blocks includes: a dual mode valve disposed in the flow path; a pressure sensor disposed in the flow path downstream from the dual mode valve; a pressure calculation section for computing a pressure based on a signal from the pressure sensor; and a control section for controlling the dual mode valve, wherein the control section in each of the plurality of leakage decision blocks closes or opens the dual mode valve instantaneously from a downstream side to an upstream side of the flow path, and the pressure calculation section computes a pressure when the dual mode valve is closed.

Because of the above-mentioned structure, gas leakage can be detected substantially without affecting the use of gas by a user. As a result, a leakage detection system with satisfactory convenience with respect to a piping system can be provided.

A gas leakage detection system of the present invention includes: a flow path; an ultrasonic measuring section including a pair of ultrasonic transducers; a forward dual mode valve disposed in the flow path upstream from the ultrasonic measuring section; a backward dual mode valve disposed in the flow path downstream from the ultrasonic measuring section; a flow rate calculation section for computing a flow rate based on a signal from the ultrasonic measuring section; and a control section for controlling the forward dual mode valve and the backward dual mode valve, wherein the control section closes or opens the forward dual mode valve and the backward dual mode valve instantaneously, and the flow rate calculation section computes a flow rate when the forward dual mode valve and the backward dual mode valve are closed.

Because of the above-mentioned structure, a zero check can be conducted substantially without affecting the use of gas by a user. Furthermore, a measuring function of a gas flow rate and a function of detecting gas leakage can be guaranteed with high precision.

Thus, the invention described herein makes possible the advantages of (1) providing a leakage detection system with satisfactory convenience, which is capable of detecting A gas leakage substantially without affecting the use of gas by a user; and (2) providing a measuring function of a gas flow rate with high precision.

BEST MODE FOR CARRYING OUT THE INVENTION

Hereinafter, the present invention will be described by way of illustrative embodiments with reference to the drawings.

Embodiment 1

Figure 1:
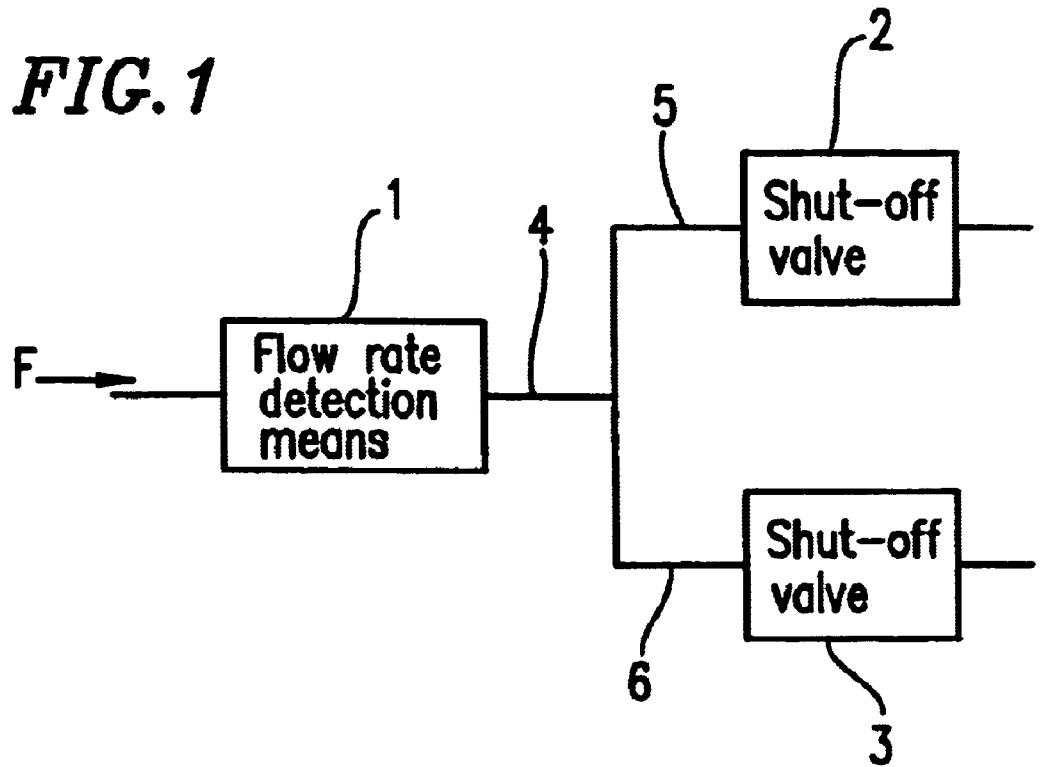
FIG. 1 is a block diagram showing a structure of a conventional gas leakage detection system.
Figure 2:
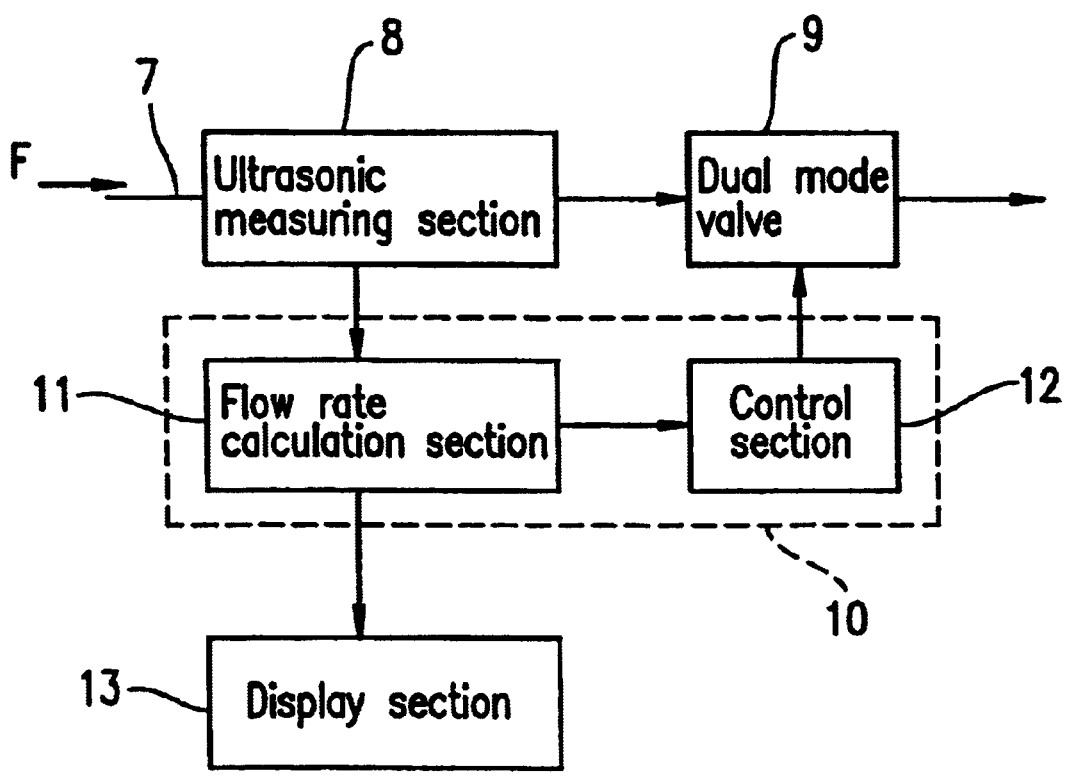
FIG. 2 is a block diagram showing a structure of a gas leakage detection system of Embodiment 1 according to the present invention.

FIG. 2 shows a structure of a gas leakage detection system of Embodiment 1 according to the present invention.

The gas leakage detection system includes a flow path 7, an ultrasonic measuring section 8 disposed in the flow path 7, and a dual mode valve 9 disposed in the flow path 7. The ultrasonic measuring section 8 is provided upstream from the dual mode valve 9. The dual mode valve 9 includes a drive circuit (not shown).

In FIG. 2, an arrow F represents a direction in which gas flows in the flow path 7.

The gas leakage detection system further includes a processing section 10 for controlling the dual mode valve 9 in accordance with measurement results determined by the ultrasonic measuring section 8 and a display section 13. The processing section 10 includes a flow rate calculation section 11 and a control section 12. The calculation results determined by the flow rate calculation section 11 are displayed on the display section 13.

Next, the operation and function of the gas leakage detection system will be described.

As shown in FIG. 2, gas leakage detection processing is performed by the processing section 10 based on a signal from the ultrasonic measuring section 8. The dual mode valve 9 is closed by the control section 12, and thereafter, a flow rate is computed by the flow rate calculation section 11. Thereafter, the dual mode valve 9 to again opened. Closing and opening of the dual mode valve 9 are performed instantaneously. The computed flow rate is displayed on the display section 13.

Figure 3:
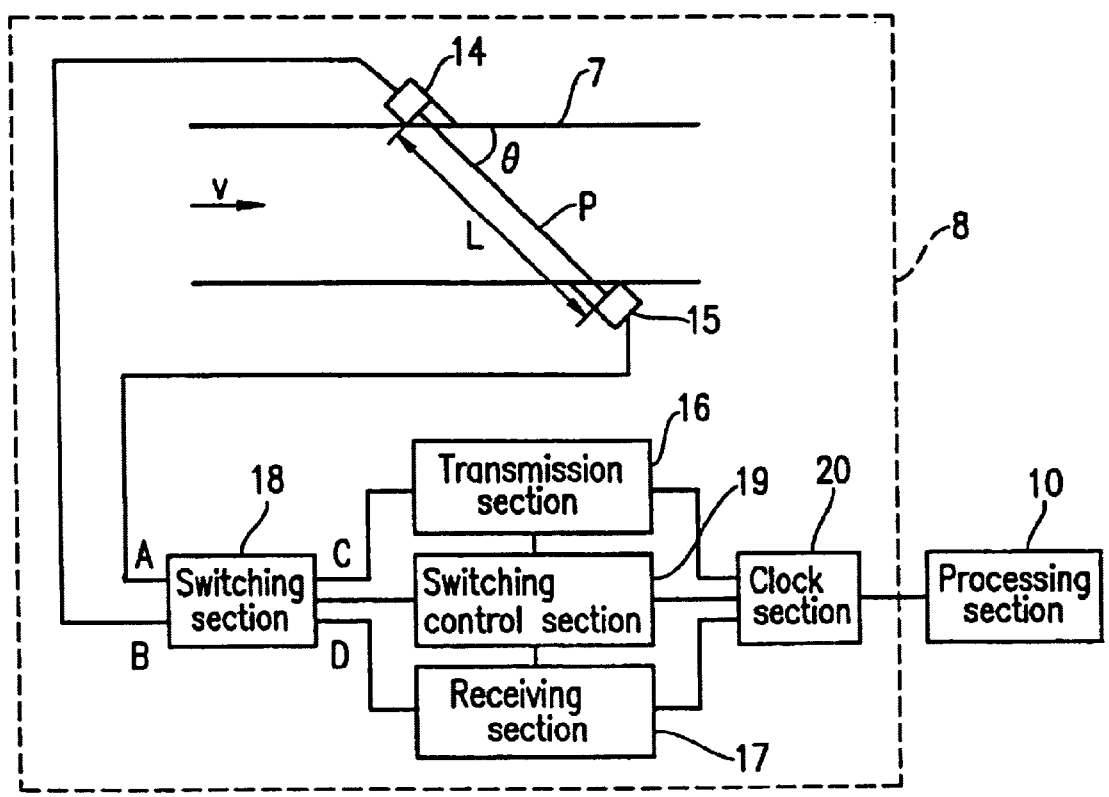
FIG. 3 is a block diagram showing a structure of an ultrasonic measuring section in the gas leakage detection system.

FIG. 3 shows a structure of the ultrasonic measuring section 8 shown in FIG. 2.

The ultrasonic measuring section 8 includes a pair of ultrasonic transducers 14 and 15 disposed with the flow path 7 interposed therebetween, a transmission section 16, a receiving section 17, a switching section 18, a switching control section 19, and a clock section 20.

Next, the ultrasonic measuring section 8 will be described in detail with reference to FIG. 3.

First, a method for measuring a flow rate of gas flowing through the flow path 7 will be described. The switching section 18 includes terminals A through D. The change in the interconnection relationship between the terminals A through D in the switching section 18 can be controlled by the switching control section 19.

Initially, the terminal B of the switching section 18 is connected to the terminal C, and the terminal A of the switching section 18 is connected to the terminal D. In this case, a signal transmitted from the transmission section 16 is input to the ultrasonic transducer 14 through the terminals C and B of the switching section 18. An ultrasonic wave output from the ultrasonic transducer 14 reaches the ultrasonic transducer 15 across the flow path 7. A signal output from the ultrasonic transducer 15 is received by the receiving section 17 via the terminals A and D of the switching section 18.

The transmission section 16 transmits a signal to the ultrasonic transducer 14 via the switching section 18 while outputting the signal to the clock section 20. The receiving section 17 receives the signal output from the ultrasonic transducer 15 via the switching section 18 and simultaneously outputs the received signal to the clock section 20. The clock section 20 measures a time difference between these signals. Thus, an elapsed-time T1 is obtained, during which an ultrasonic wave output from the ultrasonic transducer 14 traverses the flow path 7 to reach the ultrasonic transducer 15.

Next, the connection relationship among the terminals A through D of the switching section 18 is changed. More specifically, the terminal A of the switching section 18 is connected to the terminal C, and the terminal B of the switching section 18 is connected to the terminal D. Thus, an elapsed-time (T2) is obtained, during which an ultrasonic wave output from the ultrasonic transducer 15 traverses the flow path 7 to reach the ultrasonic transducer 14.

A flow rate of gas flowing in the flow path 7 is computed by the following calculation formula, using the elapsed-times T1 and T2 thus measured.

Herein, it is assumed that an angle formed by a flow of gas to be measured and an ultrasonic propagation path P is θ, and a distance between the ultrasonic transducer 14 and the ultrasonic transducer 15 is L.

A flow velocity v is computed in accordance with Formula (1).

$$v=(L/2 \cos \theta)((1/T1)-(1/T2)) \quad (1)$$

A flow rate Q is computed in accordance with Formula (2).

$$Q=kvS \quad (2)$$

In Formula (2), k is a correction coefficient for obtaining an average flow velocity, and S is a cross-sectional area of the flow path 7.

Herein, a method for obtaining the elapsed-times T1 and T2 by single measurement has been described: specifically, a method has been described, for obtaining the elapsed-times T1 and T2 by transmitting an ultrasonic wave from an upstream side to a downstream side of the flow path 7, and transmitting an ultrasonic wave from a downstream side to an upstream side of the flow path 7, respectively. However, in order to enhance measurement precision, a method called "Sing around" for repeating transmission and receiving of an ultrasonic wave may be adopted. In this case, an average of a plurality of measured elapsed-times should be adopted as the elapsed times T1 and T2, respectively.

Figure 4:
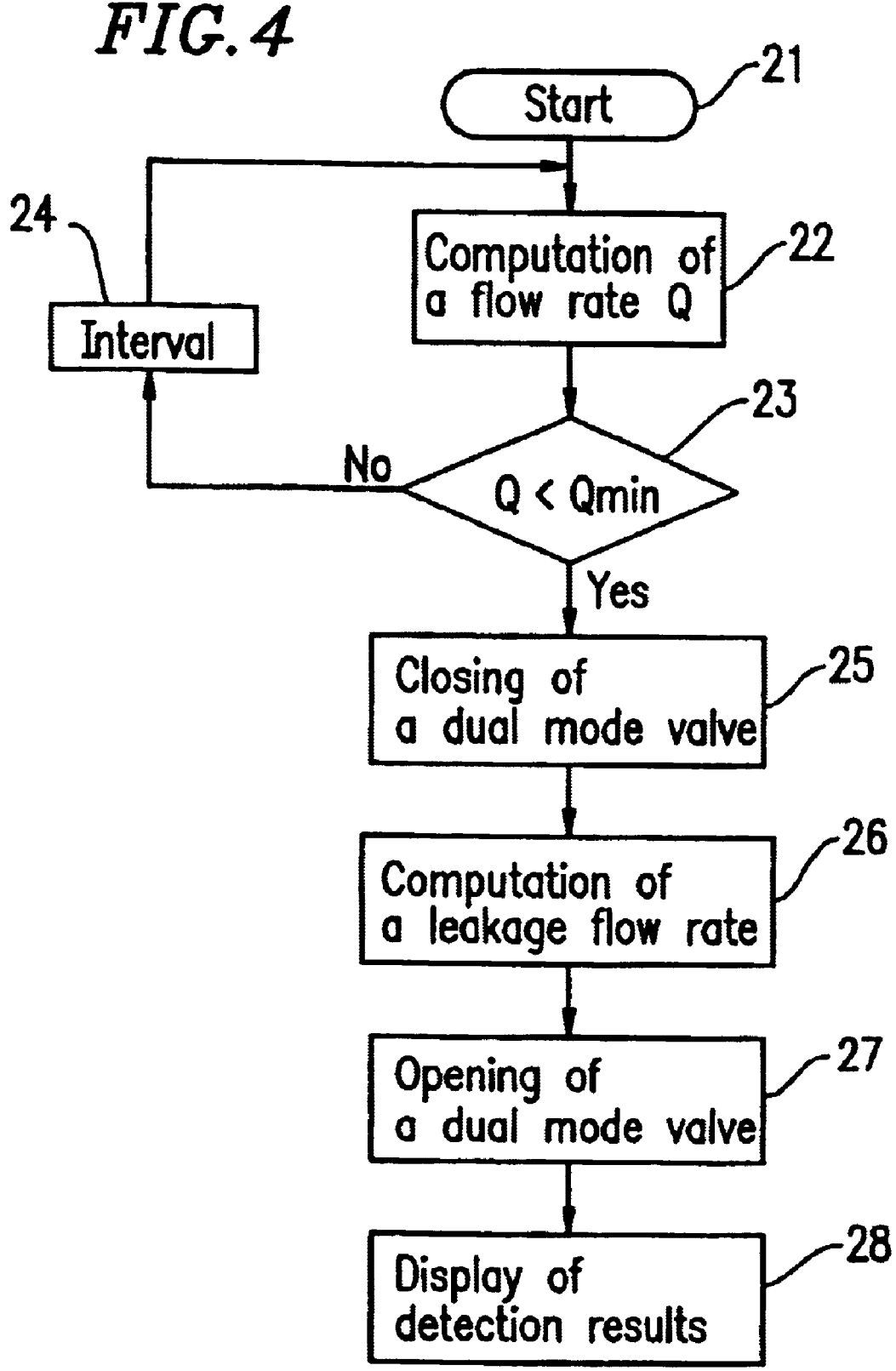
FIG. 4 is a flow chart showing a procedure of gas leakage detection processing which is performed by a processing section in the gas leakage detection system.

FIG. 4 is a flow chart showing a procedure of gas leakage detection processing performed by the processing section 10 shown in FIGS. 2 and 3.

In FIG. 4, reference numeral 21 denotes a start instruction, reference numeral 22 denotes a flow rate calculation instruction, reference numeral 23 denotes a flow rate value decision instruction, and reference numeral 24 denotes an interval setting instruction. Reference numeral 25 denotes a dual mode valve closing instruction, reference numeral 26 denotes a leakage flow rate calculation instruction, reference numeral 27 denotes a dual mode valve opening instruction, and reference numeral 28 denotes a detection result display instruction.

The dual mode valve closing instruction 25, and the dual mode valve opening instruction 27 correspond to the control section 12 (FIG. 2). Furthermore, the leakage flow rate calculation instruction 26 corresponds to the flow rate calculation section 11.

As shown in FIG. 4, a program of gas leakage detection processing is stared by the start instruction 21. First, a flow rate Q is computed by the flow rate calculation instruction 22. Next, it is decided whether or not the flow rate Q is less than a predetermined flow rate value. (Qmin) by the flow rate value decision instruction 23. The flow rate value is set in such a manner that the use of a gas supply is not substantially interrupted by a pressure and a capacity in the piping downstream from the dual mode valve 9 at shut-off time (t).

If the current flow rate value is larger than a predetermined flow rate value, "No" is selected. Then, after an elapse of time set by the interval setting instruction 24, the above-mentioned process is repeated again.

If the current flow rate value is smaller than a predetermined flow rate value, "Yes" is selected. Then, the dual mode valve 9 is closed by the dual mode valve closing instruction 25. Next, a leakage flow rate is computed by the leakage flow rate calculation instruction 26 based on Formulae (1) and (2). Thereafter, the dual mode valve 9 is opened by the dual mode valve opening instruction 27, and the results are displayed on the display section 13 by the detection result display instruction 28.

According to the principle of ultrasonic flow rate measurement, a flow in a backward direction as well as a flow in a forward direction can be detected. Therefore, leakage on an upstream side of the dual mode valve 9 can be detected based on the above-mentioned leakage flow rate value. More specifically, assuming that a flow rate is displayed as a positive value in the case where there is leakage between the ultrasonic measuring section 8 and the dual mode valve 9, a flow rate is displayed as a negative value in the case where there is leakage upstream from the ultrasonic measuring section 8.

As described above, the flow rate value (Qmin) when the dual mode valve 9 is closed for gas leakage detection and the shut-off time (t) are set to have a relationship in such a manner that the use of gas by a user is not substantially interrupted. This is predicated upon an initial gas pressure being substantially determined when the dual mode valve 9 is closed. In order to construct a safer system, it is required to dispose a pressure sensor downstream from the dual mode valve 9, to conduct measurement of a leakage flow rate while the pressure measured by the pressure sensor does not become a predetermined value or less, and to open the dual mode valve 9.

As described above, since instantaneous closing of the dual mode valve 9 is conducted in such a manner that the use of gas by a user is not substantially influenced, a leakage detection system or equipment with satisfactory convenience can be constructed.

In the present embodiment, although the ultrasonic measuring section 8 and the dual mode valve 9 are separately provided, they can be integrated.

Furthermore, by incorporating an integrated combination of the ultrasonic measuring section 8 and the dual mode valve 9 into a gas meter, a gas meter provided with a function of detecting gas leakage can be obtained.

Embodiment 2

Figure 5:
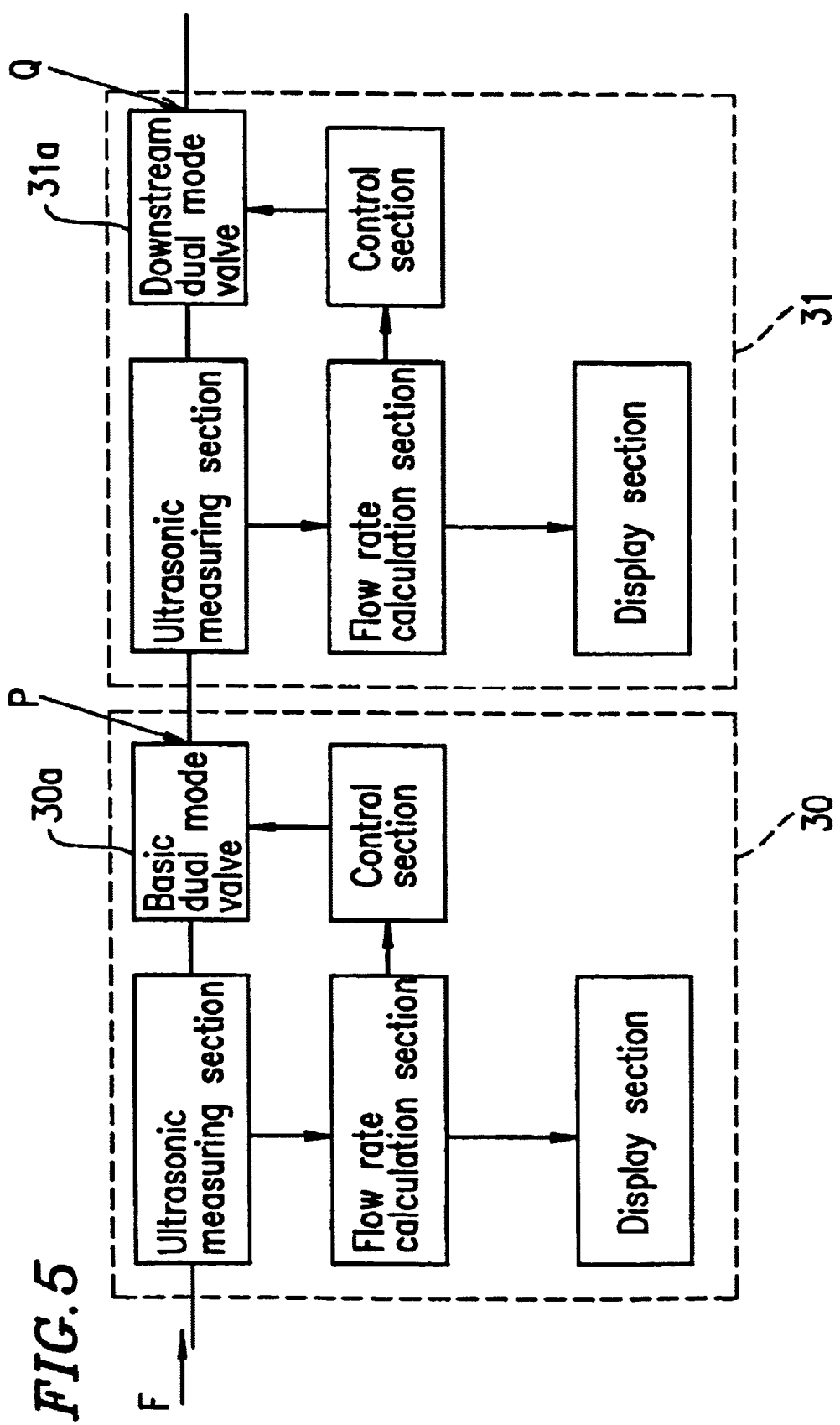
FIG. 5 is a block diagram showing a structure of a gas leakage detection system of Embodiment 2 according to the present invention.
Figure 6:
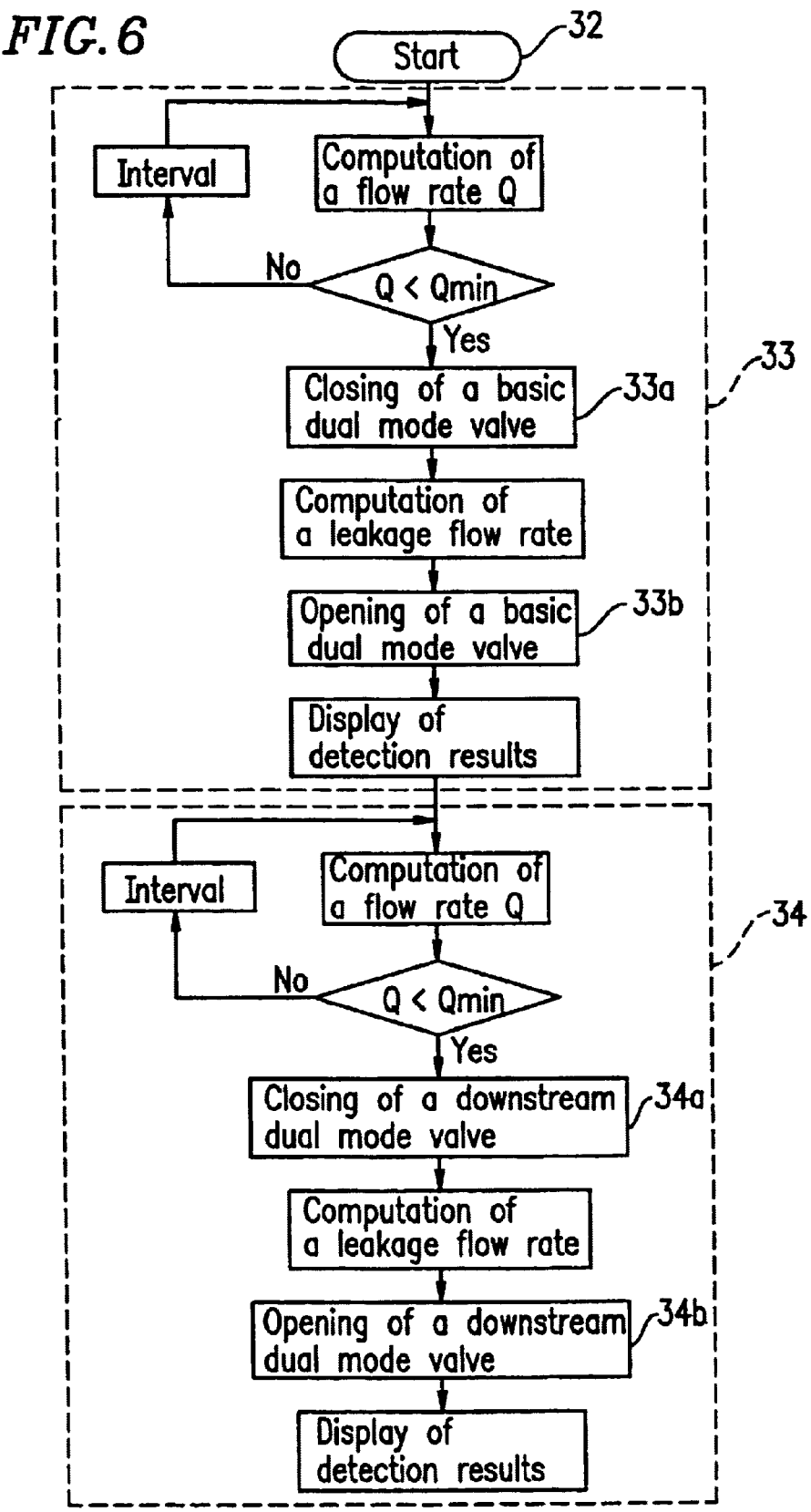
FIG. 6 is a flow chart showing a procedure of gas leakage detection processing which is performed by the gas leakage detection system.

FIG. 5 is a block diagram showing a structure of a gas leakage detection system of Embodiment 2 according to the present invention. FIG. 6 is a flow chart showing a procedure of gas leakage detection processing which is performed by the gas leakage detection system. In Embodiment 2, the structure of an ultrasonic measuring section is the same as that of the ultrasonic measuring section 8 shown in FIG. 3. Therefore, its description will be omitted.

In FIG. 5, reference numeral 30 denotes a leakage decision block for a basic section, and reference numeral 31 denotes a leakage decision block for a downstream section. Since components contained in the respective leakage decision blocks are the same as those shown in FIG. 2, their description will be omitted. For convenience of description, a dual mode valve in the leakage decision block 30 for a basic section is prescribed to be a basic dual mode valve 30a, and a dual mode valve in the leakage decision block 31 for a downstream section is prescribed to be a downstream dual mode valve 31a.

In FIG. 6, reference numeral 32 denotes a start instruction, reference numeral 33 denotes a leakage decision process for a basic section, and reference numeral 34 denotes a leakage decision process for a downstream section. Instructions contained in the respective leakage decision processes are the same as those shown in FIG. 4, so that their description will be omitted. For convenience of description, instructions related to the dual mode valve in the leakage decision process 33 for a basic section are prescribed to be an instruction 33a of closing a basic dual mode valve and an instruction 33b of opening a basic dual mods valve. Instructions related to the dual mode valve in the leakage decision process 34 for a downstream section are prescribed to be an instruction 34a of closing a downstream dual mode valve and an instruction 34b of opening a downstream dual mode valve.

Next, an operation and a function of the gas leakage detection system will be described.

In FIG. 6, inspection of leakage in the flow path 7 is started by the start instruction 32. First, leakage on an upstream side of a point P in the flow path 7 in FIG. 5 is checked by executing the leakage decision process 33 for a basic section. Next, leakage on an upstream side of a point Q in the flow path 7 in FIG. 5 is checked by execution of the leakage decision process 34 for a downstream section.

Because of the above-mentioned sequence, if leakage is not found on an upstream side of the point P, leakage from the point P to the point Q is checked. Accordingly, a check operation can be conducted in such a manner that a leakage portion is successively specified toward a downstream side.

Herein, the case of using one downstream dual mode valve has been described. However, it is possible to conduct the above-mentioned operation in a sequential manner by providing more dual mode valves.

As described above, leakage is successively checked from the basic dual mode valve 30a to a downstream side, while opening or closing the dual mode-valve instantaneously, whereby leakage in a piping system or the like can be checked at high speed substantially without having an influence on the use of gas by a user.

The above-mentioned checking method is also applicable to a process in which the dual mode valves are successively opened after a gas piping is closed, for example, due to earthquake.

Embodiment 3

Figure 7:
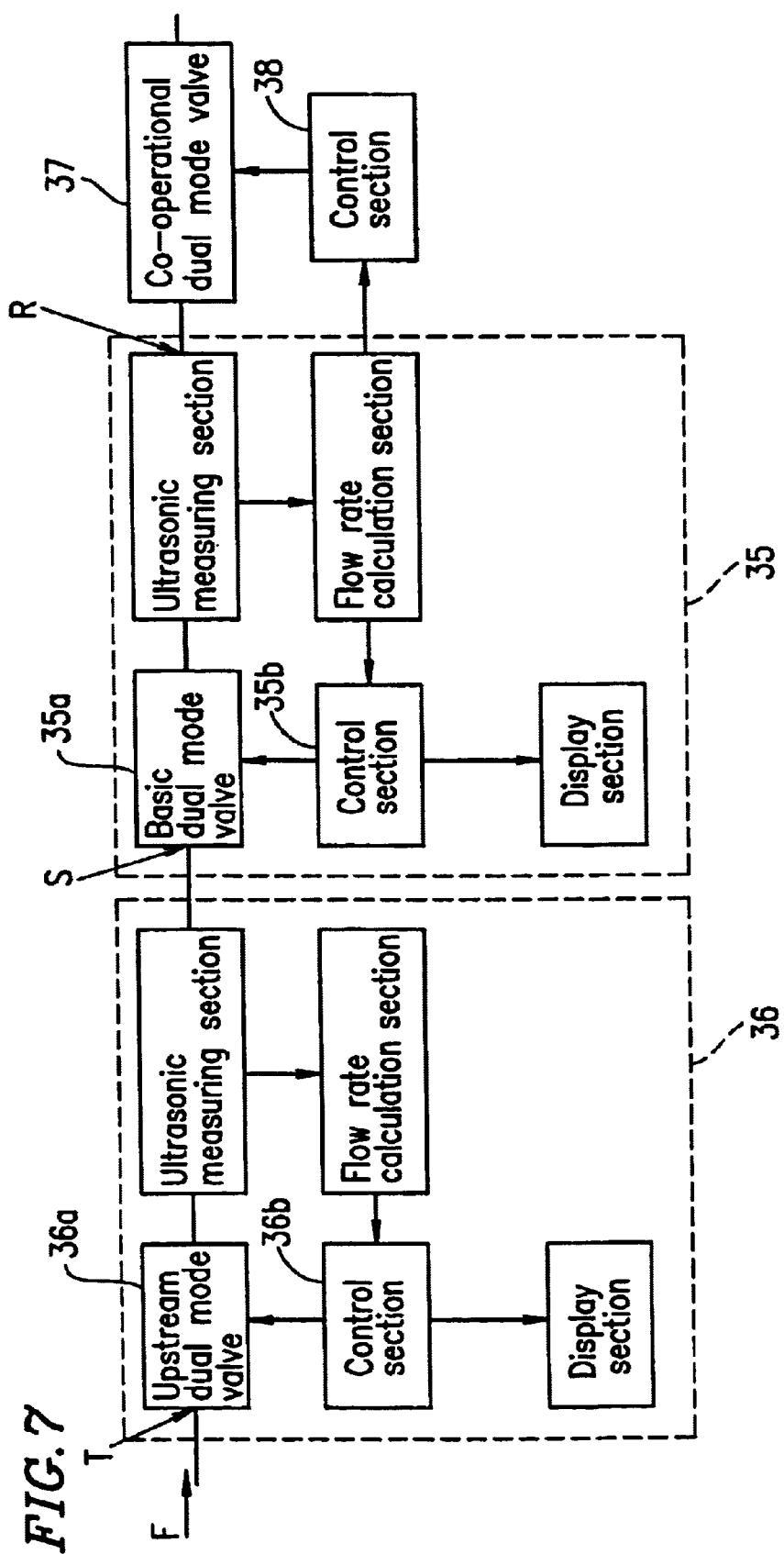
FIG. 7 is a block diagram showing a structure of a gas leakage detection system of Embodiment 3 according to the present invention.
Figure 8:
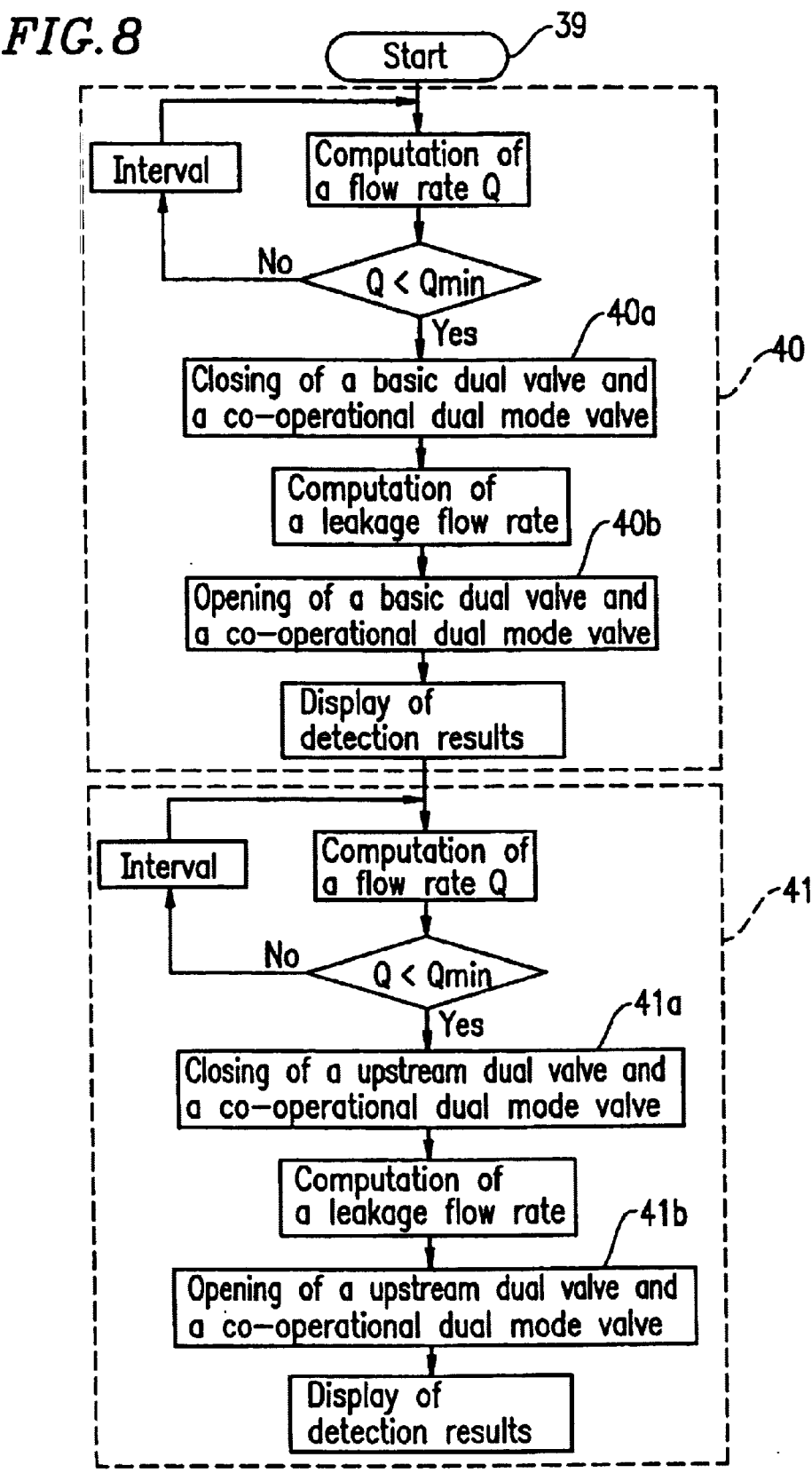
FIG. 8 is a flow chart showing a procedure of gas leakage detection processing which is performed by the gas leakage detection system.

FIG. 7 is a block diagram showing a structure of a gas leakage detection system of Embodiment 3 according to the present invention. FIG. 8 is a flow chart showing a procedure of gas leakage detection processing which is performed by the gas leakage detection system. The structure of an ultrasonic measuring section is the same as that of the ultrasonic measuring section 8 shown in FIG. 3. Therefore, its description will be omitted.

In FIG. 7, reference numeral 35 denotes a leakage decision block for a basic section, and reference numeral 36 denotes a leakage decision block for an upstream section. Since components contained in the respective leakage decision blocks are the same as those shown in FIG. 2, their description will be omitted. In FIG. 7, a positional relationship between the ultrasonic measuring section and the dual mode valve is reversed compared with that in FIG. 2. Reference numeral 35a denotes a basic dual mode valve, and reference numeral 36a denotes an upstream dual mode valve. Reference numeral 37 denotes a co-operational dual mode valve, and reference numeral 35 denotes a control section for controlling the co-operational dual mode valve 37.

In FIG. 8, reference numeral 39 denotes a start instruction, reference numeral 40 denotes a leakage decision process for a basic section, and reference numeral 41 denotes a leakage decision process for an upstream section. Since instructions contained in the respective leakage decision processes are the same as those shown in FIG. 4, their description will be omitted. Reference numeral 40a denotes an instruction of closing a basic dual mode valve and a co-operational dual mode valve, reference numeral 40b denotes an instruction of opening a basic dual mode valve and co-operational dual mode valve, reference numeral 41a denotes an instruction of closing an upstream dual mode valve and a co-operational dual mode valve, and reference numeral 41b denotes an instruction of opening an upstream dual mode valve and a co-operational dual mode valve.

Next, an operation and a function of the gas leakage detection system will be described.

In FIG. 8, inspection of leakage in the flow path 7 is started by the start instruction 39. First, leakage between points R and S in FIG. 7 is checked by execution of the leakage decision process 40 for a basic section. At this time, the basic dual mode valve 35a and the co-operational dual mode valve 37 are simultaneously closed by the control sections 35b and 38, respectively, in response to the instruction 40a of closing a basic dual Mode valve and a co-operational dual mode valve. After calculation of a flow rate of leakage, the basic dual mode valve 35a and the co-operational dual mode valve 37 are simultaneously opened by the control sections 35b and 38, respectively, in response to the instruction 40b of opening a basic dual mode valve and a co-operational dual mode valve.

Next, leakage between points R and T in the flow path 7 in FIG. 7 is checked by execution of the leakage decision process 41 for an upstream section. At this time, the upstream dual mode valve 36a and the co-operational dual mode valve 37 are simultaneously closed by the control sections 36b and 38, respectively, in response to the instruction 41a of closing an upstream dual mode valve and a co-operational dual mode valve. After calculation of a flow rate of leakage, the upstream dual mode valve 36a and the co-operational dual mode valve 37 are simultaneously opened by the control sections 36b and 38, respectively, in response to the instruction 41b of opening an upstream dual mode valve and a co-operational dual mode valve.

Because of the above-mentioned sequence, if leakage is not found between the points R and S, leakage between the points S and T is checked. Accordingly, a check operation can be conducted in such a manner that a leakage portion is successively specified toward an upstream side.

Herein, the case of using one upstream dual mode valve has been described. However, it is possible to conduct the above-mentioned operation in a sequential manner by providing more dual mode valves.

As described above, leakage is successively checked from the basic dual mode valve 35a to an upstream side, while opening or closing the dual mode valve instantaneously, whereby leakage in a piping system or the like can be checked at high speed substantially without having an influence on the use of gas by a user.

In the above-mentioned three embodiments, the case of using gas has been described. Needless to say, the present invention is also applicable to the case where gas is not used (i.e., the case where gas does not flow).

Embodiment 4

Figure 9:
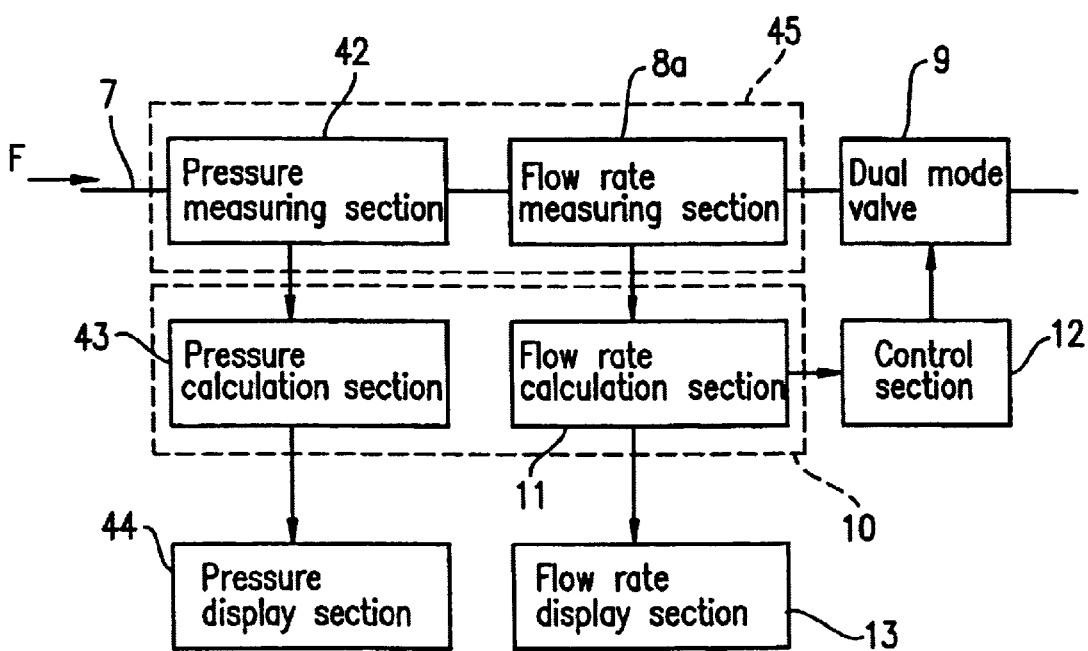
FIG. 9 is a block diagram showing a structure of a gas leakage detection system of Embodiment 4 according to the present invention.

FIG. 9 shows a structure of a gas leakage detection system of Embodiment 4 according to the present invention.

In Embodiment 4, the same components as those of Embodiment 1 are denoted by the same reference numerals as those therein.

In FIG. 9, reference numeral 42 denotes a pressure measuring section, reference numeral 43 denotes a pressure calculation section, and reference numeral 44 denotes a pressure display section. Reference numeral 45 denotes a measuring section. The measuring section 45 includes the pressure measuring section 42 and a flow rate measuring section 8a.

Figure 10:
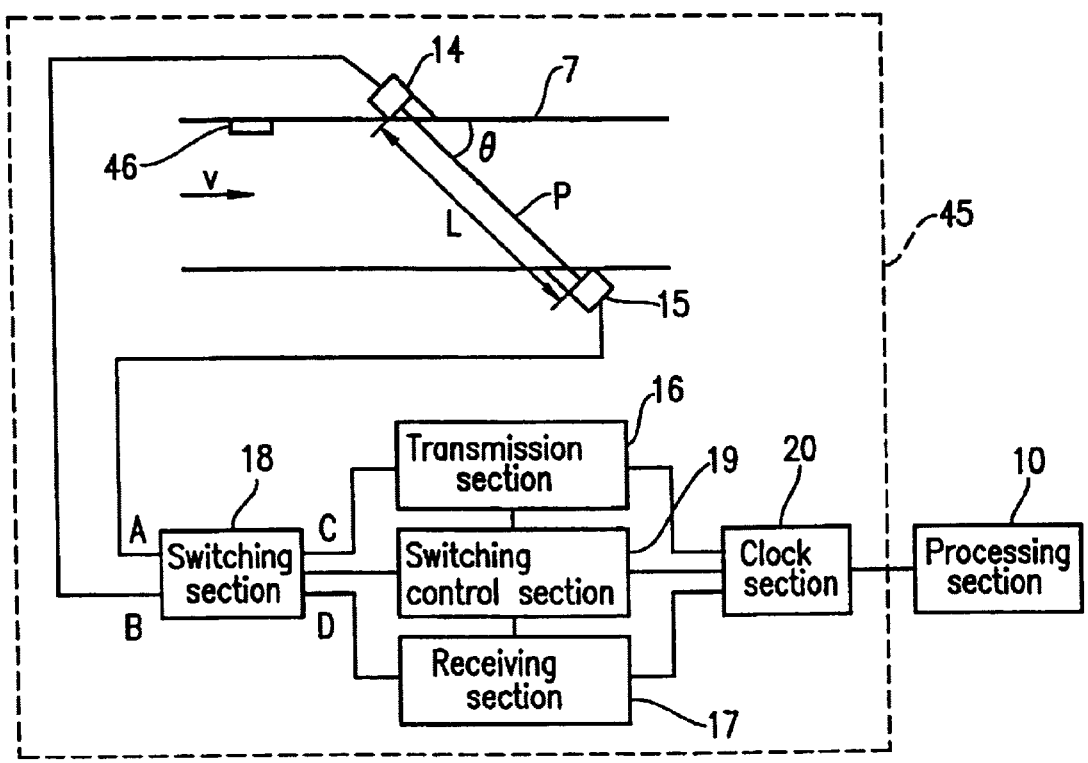
FIG. 10 is a block diagram showing a structure of a measuring section in the gas leakage detection system.

FIG. 10 shows a structure of the measuring section 45 shown in FIG. 9.

In FIG. 10, reference numeral 46 denotes a pressure sensor (pressure measuring section).

Next, an operation and a function of the gas leakage detection system will be described.

In FIG. 9, gas leakage detection processing is performed by a processing section 10 based on a signal from the flow rate measuring section 8a. After a dual mode valve 9 is closed by a control section 12, a pressure change is computed by the pressure calculation section 43. Thereafter, the dual mode valve 9 is opened. Opening and closing of the dual mode valve 9 are performed instantaneously. A calculated pressure value is displayed on the pressure display section 44.

A method for measuring a flow rate by the flow rate measuring section 8a is the same as that in Embodiment 1. Therefore, its description will be omitted here.

Figure 11:
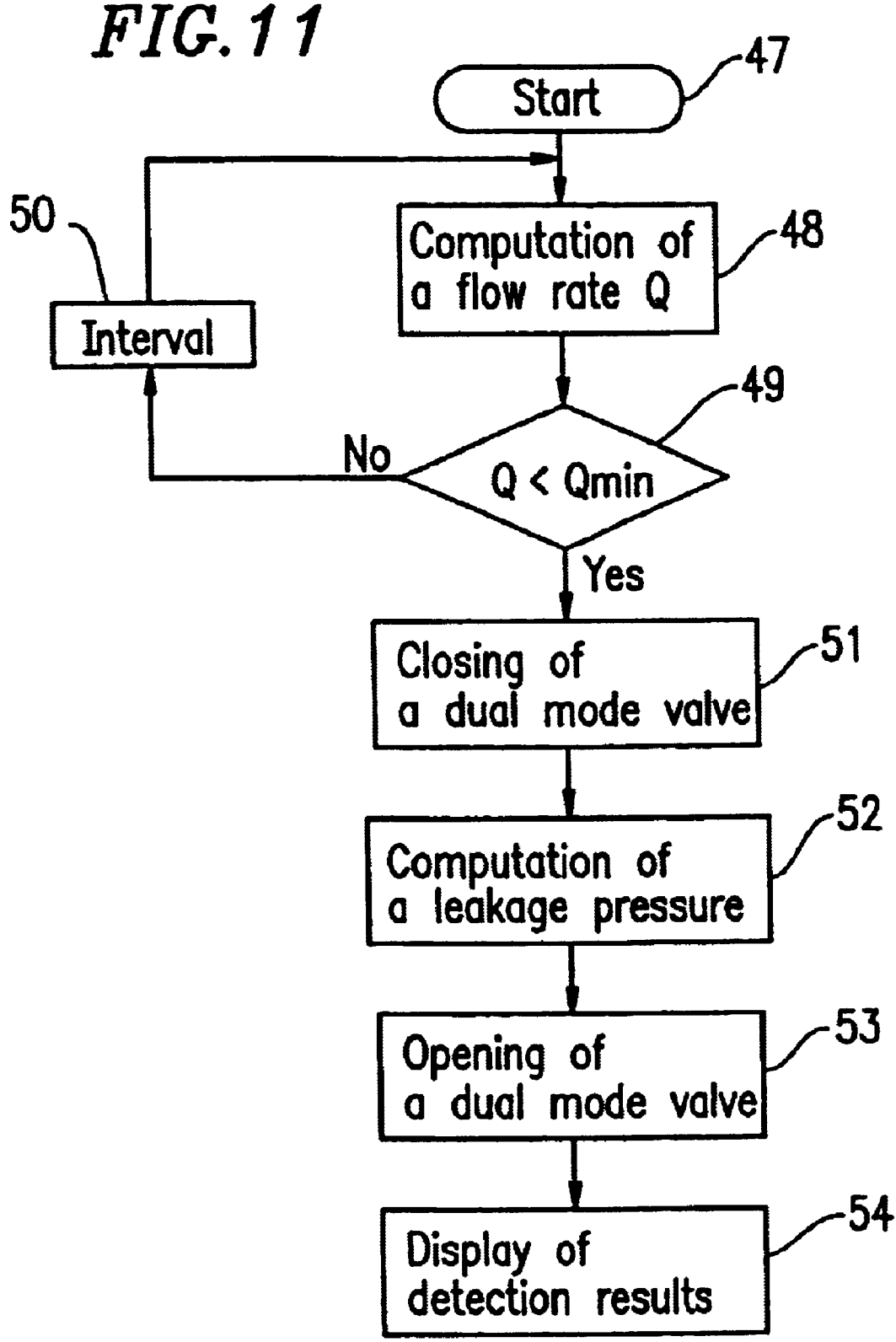
FIG. 11 is a flow chart showing a procedure of gas leakage detection processing which is performed by a processing section in the gas leakage detection system.

FIG. 11 is a flow chart showing a procedure of gas leakage detection processing which is performed by the processing section 10 shown in FIG. 9.

In FIG. 11, reference numeral 47 denotes a start instruction, reference numeral 48 denotes a flow rate computation instruction, reference numeral 49 denotes a flow rate value decision instruction, and reference numeral 50 denotes an interval setting instruction. Reference numeral 51 denotes a dual mode valve closing instruction, reference numeral 52 denotes a leakage pressure computation instruction, reference numeral 53 denotes a dual mode valve opening instruction, and reference numeral 54 denotes a detection result display instruction.

The dual mode closing instruction 51 and the dual mode opening instruction 53 correspond to the control section 12. The leakage pressure computation instruction 52 corresponds to the pressure calculation section 43.

As shown in FIG. 11, a program of gas leakage detection processing is started by the start instruction 47. First, a flow rate Q is computed by the flow rate computation instruction 48. Then, it is decided whether or not the flow rate Q is less than a predetermined flow rate value (Qmin) by the flow rate value decision instruction 49. The flow rate value is set in such a manner that the use of a gas supply is not substantially interrupted by a pressure and a capacity in the piping downstream from the dual mode valve 9 at shut-off time (t) of the dual mode valve 9.

If the current flow rate value is larger than a predetermined flow rate value, "No" is selected. Then, after an elapse of time set by the interval setting instruction 50, the above-mentioned process is repeated again.

If the current flow rate value is smaller than a predetermined flow rats value, "Yes" is selected. Then, the dual mode valve 9 is closed by the dual mode valve closing instruction 51. Next, a slope of a change in pressure is computed by the leakage pressure computation instruction 52. Thereafter, the dual mode valve 9 is opened by the dual mode valve opening instruction 53, and the results are displayed on the pressure display section 44 by the detection result display instruction 54.

In the case of no leakage, there is no slope of a change in pressure when the dual mode valve 9 is closed. However, in the case where there is leakage, a slope of a change in pressure is obtained. Thus, the presence of leakage can be decided.

As described above, a change in pressure is used in a leakage detection system, and instantaneous closing of the dual mode valve 9 is conducted so as not to substantially affect the use of gas by a user. Therefore, a leakage detection system and equipment with satisfactory convenience can be constructed.

Embodiment 5

Figure 12:
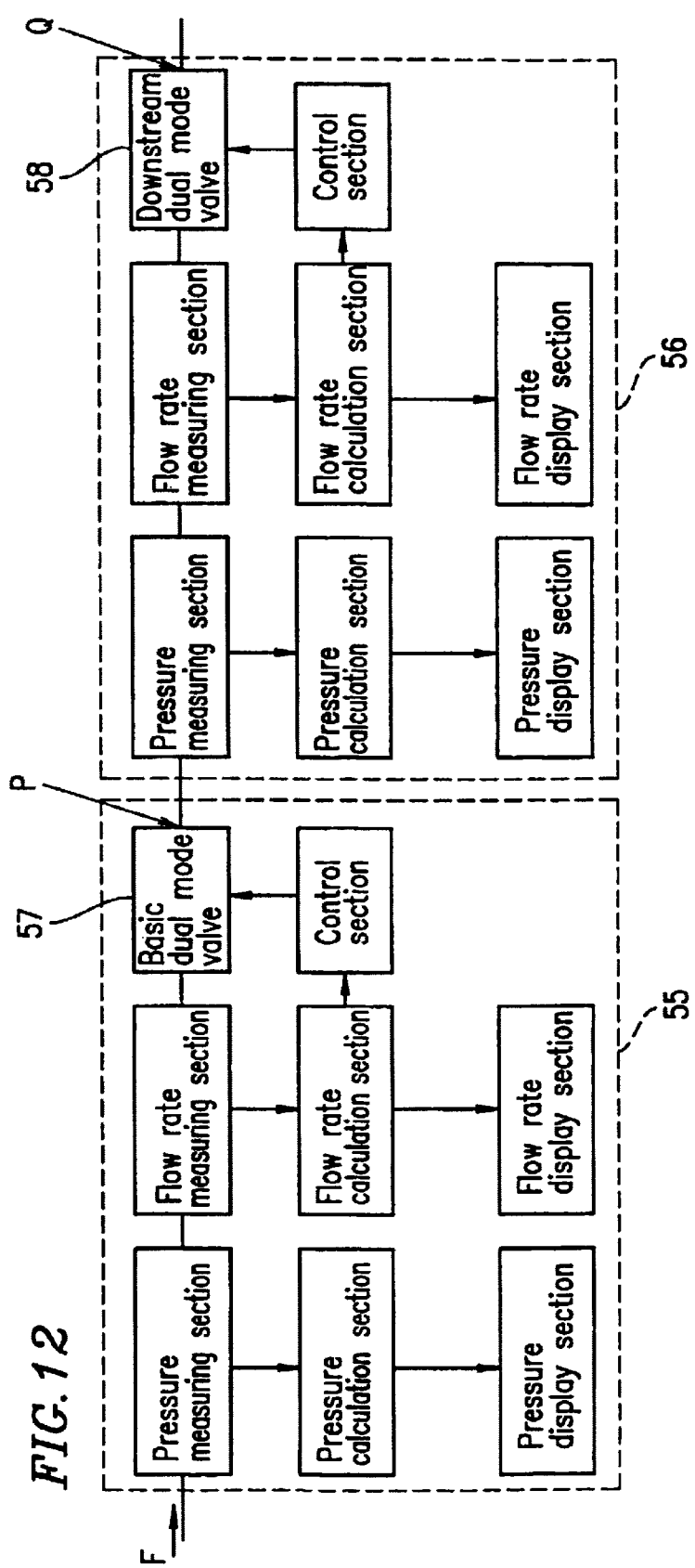
FIG. 12 is a block diagram showing a structure of a gas leakage detection system of Embodiment 5 according to the present invention.
Figure 13:
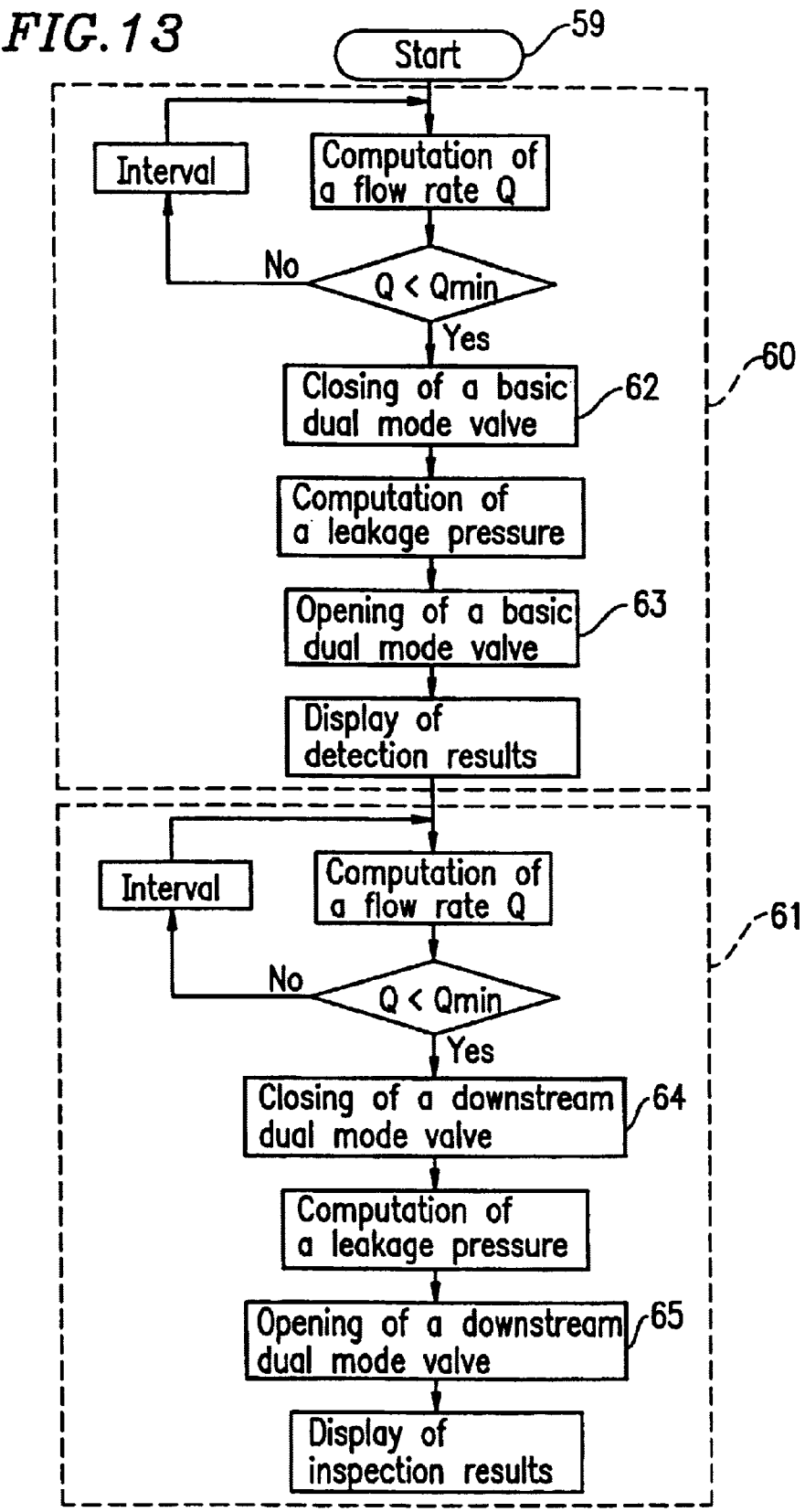
FIG. 13 is a flow chart showing a procedure of gas leakage detection processing which is performed by the gas leakage detection system.

FIG. 12 is a block diagram showing a structure of a gas leakage detection system of Embodiment 5 according to the present invention. FIG. 13 is a flow chart showing a procedure of gas leakage detection processing which is performed by the gas leakage detection system. In Embodiment 5, the structure of a flow rate measuring section is the same as that of the ultrasonic measuring section 8 in FIG. 3. Therefore, its description will be omitted.

In FIG. 12, reference numeral 55 denotes a leakage decision block for a basic section, and reference numeral 56 denotes a leakage decision block for a downstream section. Components contained in the respective leakage decision blocks are the same as those in FIG. 9. Therefore, their description will be omitted. For convenience of description, a dual mode valve in the leakage decision block for a basic section 55 is prescribed to be a basic dual mode valve 57, and a dual mode valve in the leakage decision block for a downstream section 56 is prescribed to be a downstream dual mode valve 58.

In FIG. 13, reference numeral 59 denotes a start instruction, reference numeral 60 denotes a leakage decision process for a basic section, and reference numeral 61 denotes a leakage decision process for a downstream section. Instructions contained in the respective leakage decision processes are the same as those in FIG. 11. Therefore, their description will be omitted. For convenience of description, instructions related to the dual mode valve in the leakage decision process 60 for a basic section are prescribed to be a basic dual mode valve closing instruction 62 and a basic dual mode valve opening instruction 63, and instructions related to the dual mode valve in the leakage decision process 61 for a downstream section are prescribed to be a downstream dual mode valve closing instruction 64 and a downstream dual mode valve opening instruction 65.

Next, an operation and a function of the gas leakage detection system will be described.

In FIG. 13, inspection of leakage in the flow path 7 is started by the start instruction 59. First, leakage on an upstream side of a point P in the flow path 7 in FIG. 12 is checked by execution of the leakage decision process 60 for a basic section. Then, leakage on an upstream side of a point Q in the flow path 7 in FIG. 12 is checked by execution of the leakage decision process 61 for a downstream section.

Because of the above-mentioned sequence, if leakage is not found on the upstream side of the point P, leakage between the points P and Q is checked. Accordingly, a check operation can be conducted in such a manner that a leakage portion is successively specified toward a downstream side.

Herein, the case of using one downstream dual mode valve has been described. However, it is possible to conduct the above-mentioned operation in a sequential manner by providing more dual mode valves.

As described above, a change in pressure is used in a leakage detection system, and leakage is successively checked by opening or closing the dual mode valves instantaneously from the basic dual mode valve 57 to a downstream side. Therefore, leakage in a piping system or the like can be checked at high speed substantially without affecting the use of gas by a user.

Embodiment 6

Figure 14:
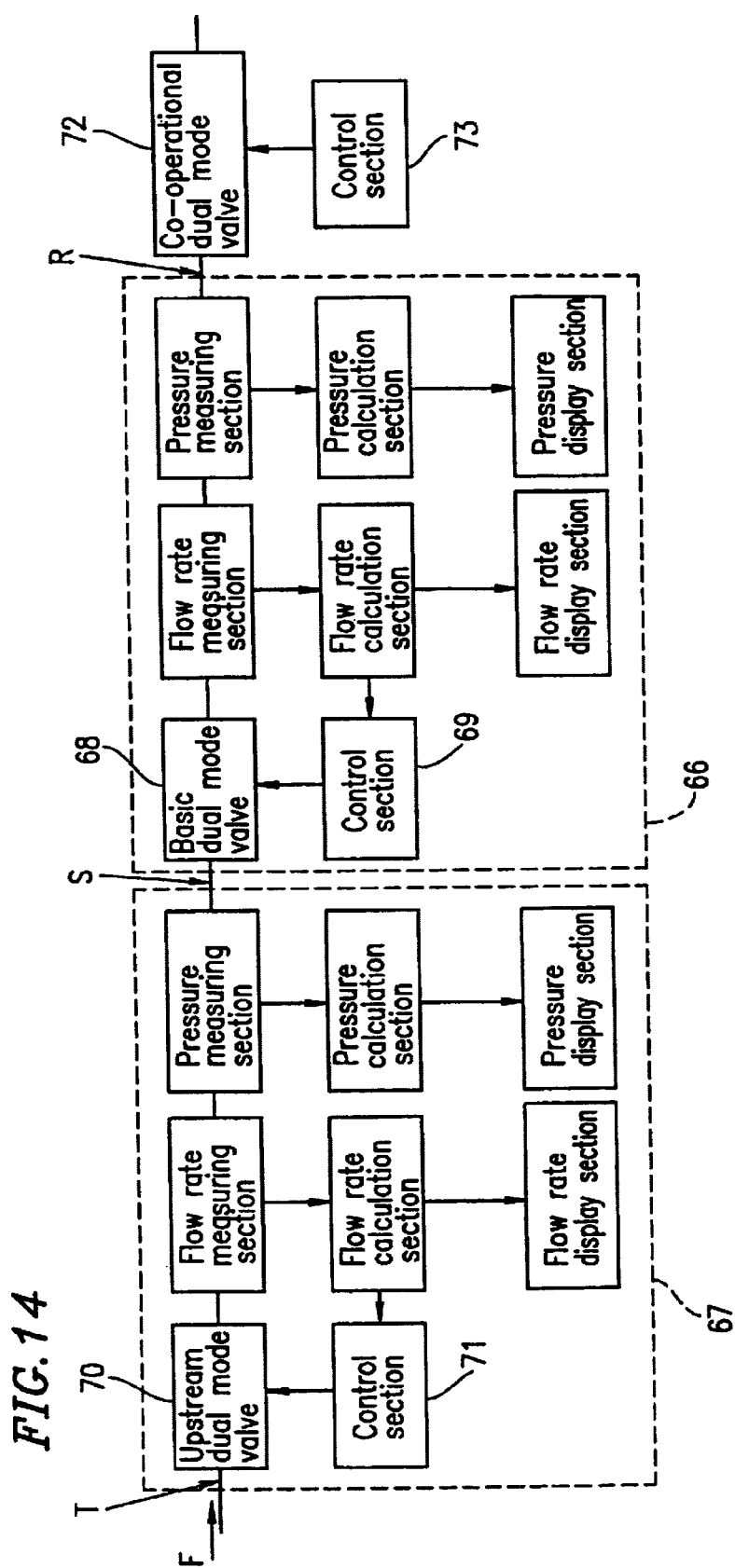
FIG. 14 is a block diagram showing a structure of a gas leakage detection system of Embodiment 6 according to the present invention.
Figure 15:
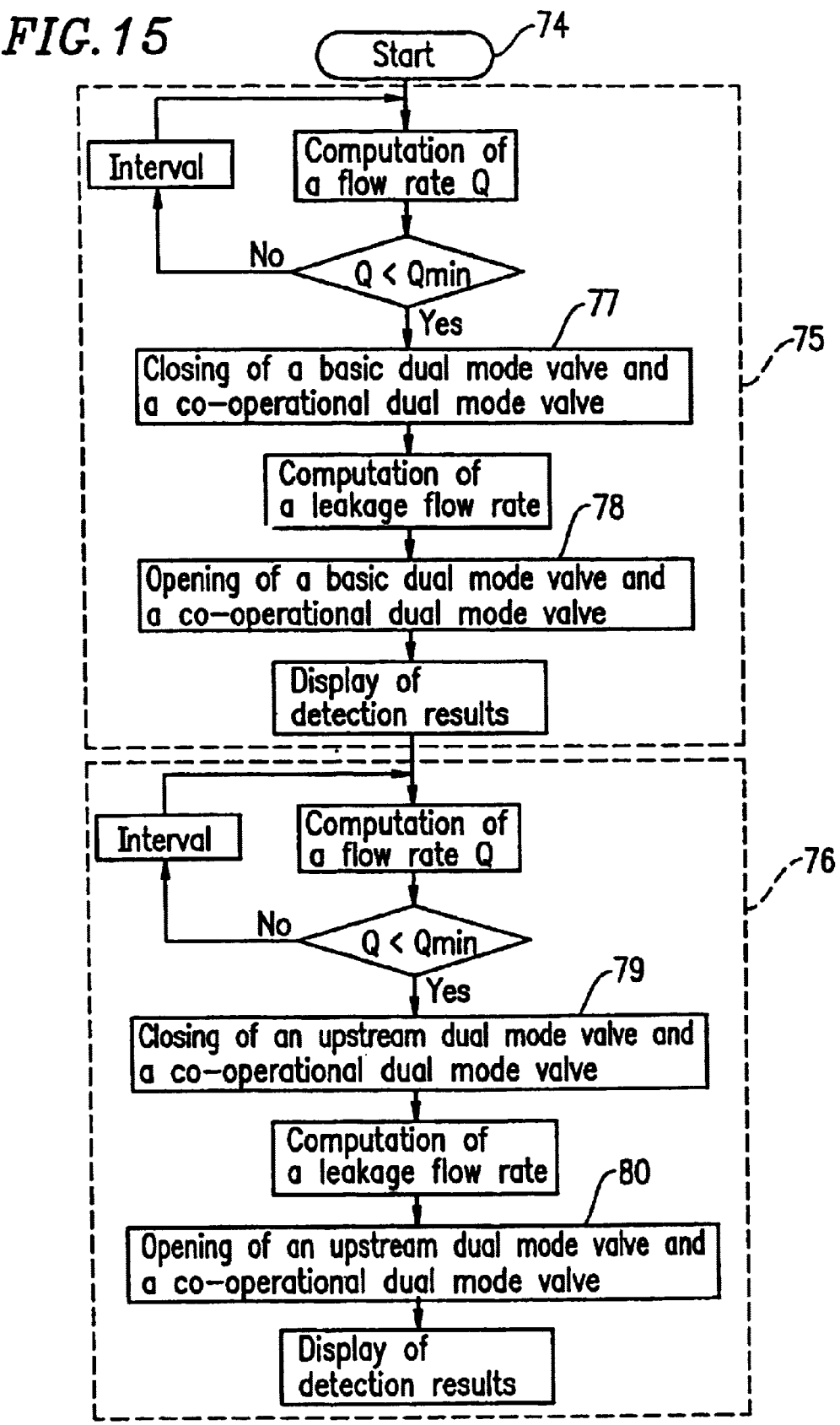
FIG. 15 is a flow chart showing a procedure of gas leakage detection processing which is performed by the gas leakage detection system.

FIG. 14 is a block diagram showing a structure of a gas leakage detection system of Embodiment 6 according to the present invention. FIG. 15 is a flow chart showing a procedure of gas leakage detection processing which is performed by the gas leakage detection system. In Embodiment 6, the structure of a flow rate measuring section is the same as that of the ultrasonic measuring section 8 shown in FIG. 3. Therefore, its description will be omitted.

In FIG. 14, reference numeral 66 denotes a leakage decision block for a basic section, and reference numeral 67 denotes a leakage decision block for an upstream section. Components contained in the respective leakage decision blocks are the same as those in FIG. 9. Therefore, their description will be omitted.

In FIG. 14, a positional relationship between the pressure/flow rate measuring sections and the dual mode valve is reversed, compared with that shown in FIG. 9. Reference numeral 68 denotes a basic dual mode valve, reference numeral 69 denotes a control section, and reference numeral 70 denotes an upstream dual mode valve. Reference numeral 71 denotes a control section, and reference numeral 72 denotes a co-operational dual mode valve, and reference numeral 73 denotes a control section for controlling the co-operational dual mode valve 72.

In FIG. 15, reference numeral 74 denotes a start instruction, reference numeral 75 denotes a leakage decision process for a basic section, and reference numeral 76 denotes a leakage decision process for an upstream section. Instructions contained in the respective leakage decision processes are the same as those in FIG. 11. Therefore, their description will be omitted. Reference numeral 77 denotes an instruction of closing a basic dual mode valve and a co-operational dual mode valve, reference numeral 78 denotes an instruction of opening a basic dual mode valve and a co-operational dual mode valve, reference numeral 79 denotes an instruction of closing an upstream dual mode valve and a co-operational dual made valve, and reference numeral 80 denotes an instruction of opening a downstream dual mode valve and a co-operational dual mode valve.

Next, an operation and a function of the gas leakage detection system will be described.

In FIG. 15, inspection of leakage in the flow path 7 is started by the start instruction 74. First, leakage between points R and S in the flow path 7 in FIG. 14 is checked by execution of the leakage decision process 75 for a basic section. Then, leakage between points S and T in the flow path 7 in FIG. 14 is checked by execution of the leakage decision process 76 for an upstream section.

Because of the above-mentioned sequence, if leakage is not found between the points R and S, leakage between the points S and T is checked. Accordingly, a check operation can be conducted in such a manner that a leakage portion is successively specified toward an upstream side.

Herein, the case of using one upstream dual mode valve has been described. However, it is possible to conduct the above-mentioned operation in a sequential manner by providing more dual mode valves.

As described above, a change in pressure is used in a leakage detection system, and leakage is successively checked by opening or closing the dual mode valves instantaneously from the basic dual mode valve 68 to an upstream side. Therefore, leakage in a piping system or the like can be checked at high speed substantially without affecting the use of gas by a user.

Embodiment 7

Figure 16:
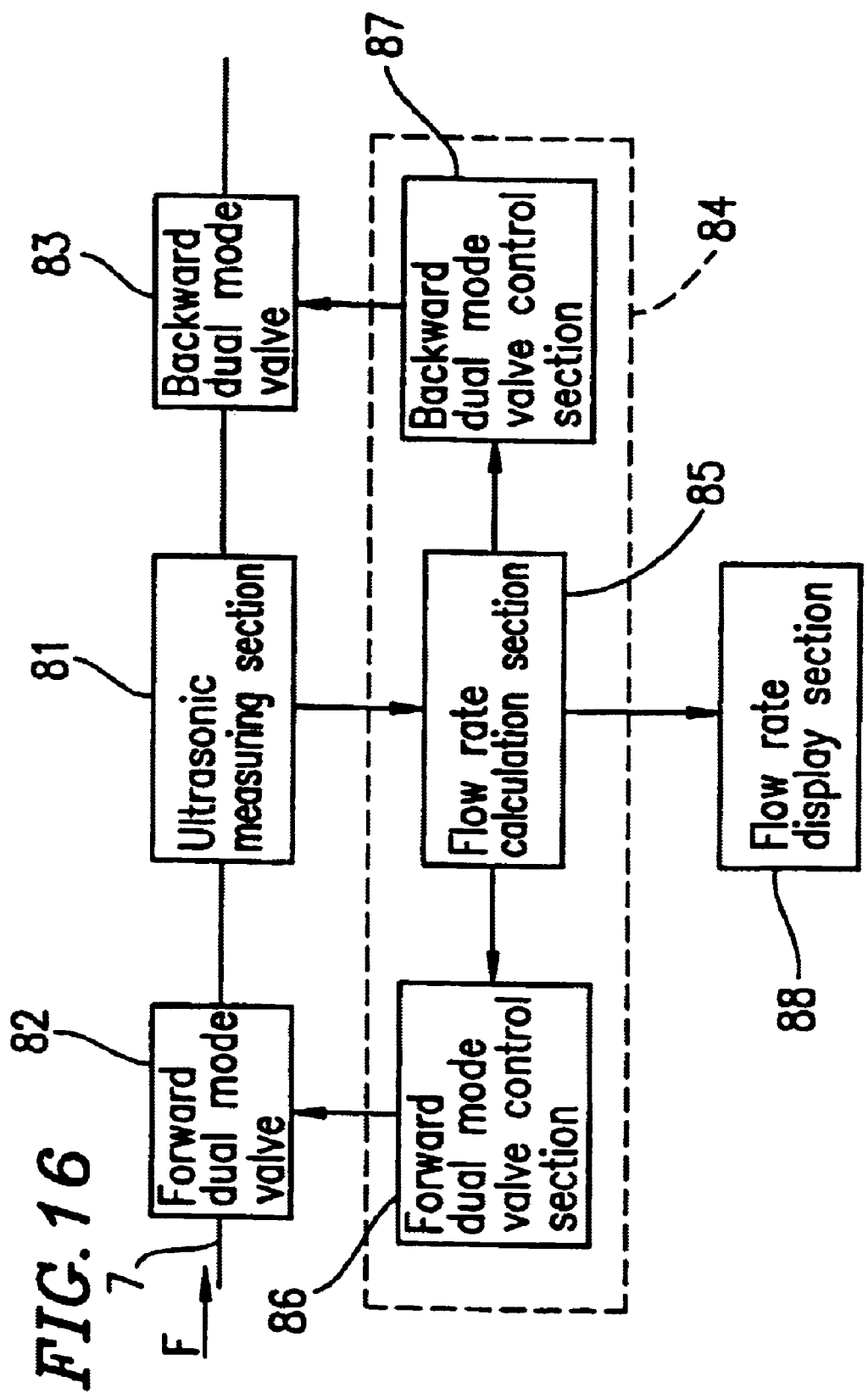
FIG. 16 is a block diagram showing a structure of a gas leakage detection system of Embodiment 7 according to the present invention.

FIG. 16 is a block diagram showing a structure of a gas leakage detection system of Embodiment 7 according to the present invention. In Embodiment 7, the structure of an ultrasonic measuring section 81 is the same as that of the ultrasonic measuring section 8 shown in FIG. 3. Therefore, its description will be omitted.

As shown in FIG. 16, a forward dual mode valve 82 is disposed upstream from the ultrasonic measuring section 81, and a backward dual mode valve 83 is disposed downstream from the ultrasonic measuring section 81. A driving circuit (not shown) is included in the forward dual mode valve 82. A driving circuit (not shown) is included in the backward dual mode valve 83. The forward dual mode valve 82 and the backward dual mode valve 83 are disposed in the vicinity of the ultrasonic measuring section 81. A piping between the forward dual mode valve 82 and the ultrasonic measuring section 81 and a piping between the ultrasonic measuring section 81 and the backward dual mode valve 83 are constructed with a material and a structure which will not cause leakage for a long period of time.

A processing section 84 includes a flow rate calculation section 85, a forward dual mode valve control section 86 for controlling the forward dual mode valve 82, and a backward dual mode valve control section 87 for controlling the backward dual mode valve 83. Calculation results of the flow rate calculation section 85 are displayed on the flow rate display section 88.

Next, an operation and a function of the gas leakage detection system will be described.

In FIG. 16, a zero check is performed by the processing section 84 based on a signal from the ultrasonic measuring section 81. After the forward dual mode valve 82 and the backward dual mode valve 83 are closed by the forward dual mode valve control section 86 and the backward dual mode valve control section 87, respectively, a flow rate is computed by the flow rate calculation section 85, and zero check is performed. Then, the forward dual mode valve 82 and the backward dual mode valve 83 are opened. Closing and opening of the forward dual mode valve 82 and the backward dual mode valve 83 are performed instantaneously. The calculated flow rate value is displayed on the flow rate display section 88.

Figure 17:
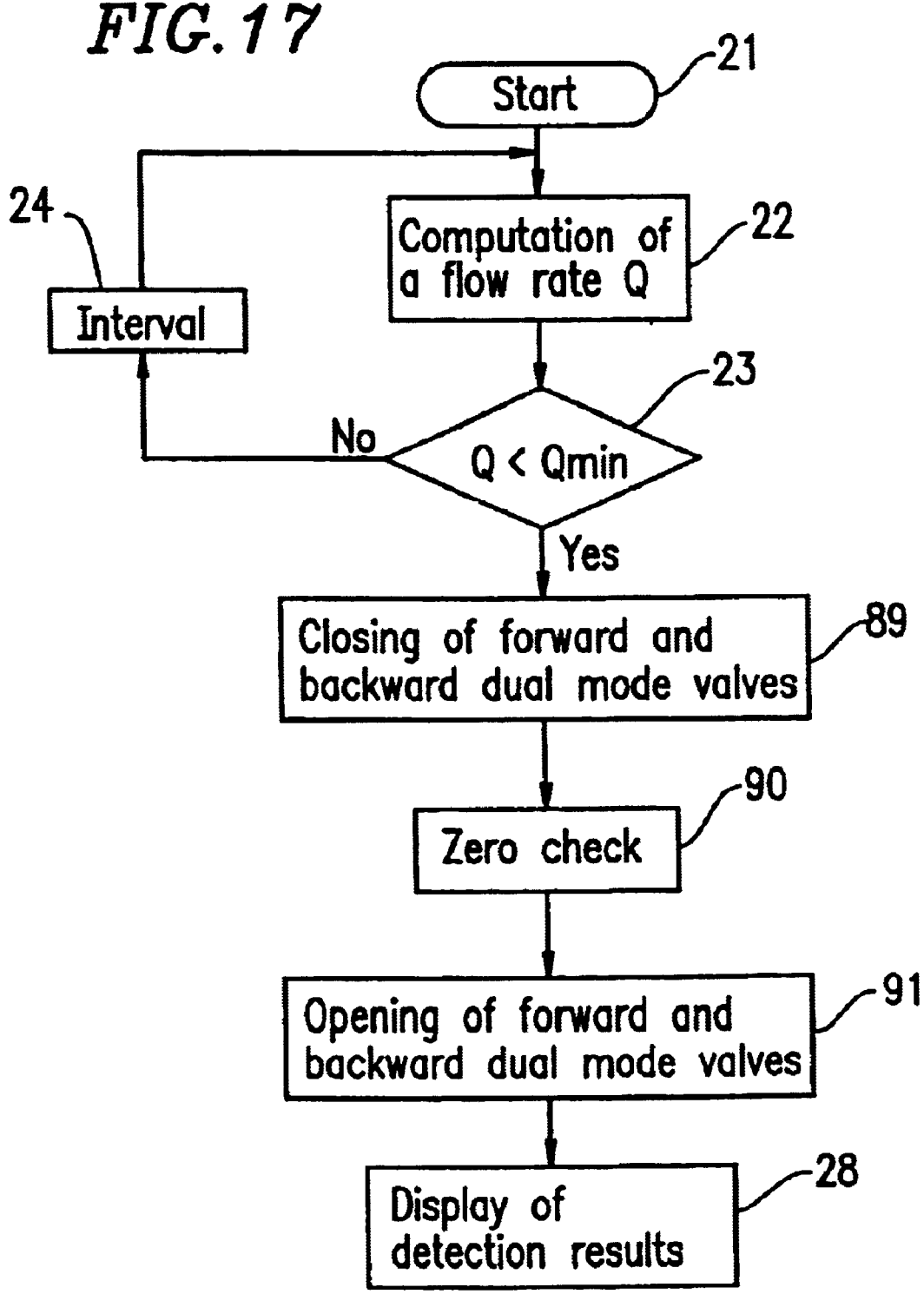
FIG. 17 is a flow chart showing a procedure of gas leakage detection processing which is performed by a processing section in the gas leakage detection system.

FIG. 17 is a flow chart showing a procedure of zero check processing which is performed by the processing section 84 shown in FIG. 16.

In FIG. 17, the same instructions as those in FIG. 4 are denoted by the same reference numerals as those therein. Their description will be omitted. Reference numeral 89 denotes an instruction of closing forward and backward dual mode valves, reference numeral 90 denotes a zero check instruction, and reference numeral 91 denotes an instruction of opening forward and backward dual mode valves.

The instruction of closing forward and backward dual mode valves 89 and the instruction of opening forward and backward dual mode valves 91 correspond to the forward dual mode valve control section 86 and the backward dual mode valve control section 87. The zero check instruction 90 corresponds to the flow rate calculation section 85.

As shown in FIG. 17, a program of zero check processing is started by the start instruction 21. First, a flow rate Q is computed by the flow rate computation instruction 22. Next, it is decided whether or not the flow. rate Q is less than a predetermined flow rate value (Qmin) by the flow rate value decision instruction 23. The flow rate value is set in such a manner that the use of a gas supply is not substantially interrupted by a pressure and a capacity in the piping downstream from the backward dual mode valve 83 at shut-off time (t) of the forward dual mode valve 82 and the backward dual mode valve 83.

If the current flow rate value is larger than a predetermined flow rate value, "No" is selected. Then, after an elapse of time set by the interval setting instruction 24, the above-mentioned process is repeated again.

If the current flow rate value is smaller than a predetermined flow rate value, "Yes" is selected. Then, the forward dual mode valve 82 and the backward dual mode valve 83 are closed by the instruction of closing forward and backward dual mode valves 89.

Next, the flow rate is computed by the zero check instruction 90. Thereafter, the forward dual mode valve 82 and the backward dual mode valve 83 are opened by the instruction of opening forward and backward dual mode valves 91. Results are displayed by the inspection result display instruction 28 on the flow rate display section 88.

As described above, the forward dual mode valve 82 and the backward dual mods valve 83 are closed instantaneously, whereby zero check of the ultrasonic measuring section can be performed so as not to substantially affect the use of gas by a user. Thus, a system, equipment, or the like can be constructed with a flow rate measuring precision guaranteed.

In Embodiment 7, one of the forward dual mode valve 82 and the backward dual mode valve 83 is opened or closed instantaneously after zero check processing, whereby the same operations as those in Embodiments 1, 2, and 3 can be performed.

In all the above-mentioned embodiments, it is decided whether or not a flow rate value is less than a predetermined flow rate before a dual mode valve is closed. However, if a pressure sensor is disposed on a downstream side of the dual mode valve so as to monitor a pressure after the dual mode valve is closed, such decision is not necessary.

Furthermore, in the case where a flow movement remains in a piping after the dual mode valve is closed, the flow movement in the piping is monitored by the flow rate measuring section, and can be measured after leakage becomes detectable.

Furthermore, in the case where a flow rate is measured after a dual mode valve is opened, and the measured flow rate is largely different from a flow rate before the dual mode valve is closed, the dual mode valve is again closed. Thus, safety involved in opening or closing a dual mode valve can be kept.

INDUSTRIAL APPLICABILITY

As described above, according to the present invention, gas leakage can be detected substantially without affecting the use of gas by a user. As a result, a leakage detection system with satisfactory convenience can be provided.

Furthermore, according to the present invention, a measuring function of a gas flow rate and a function of detecting gas leakage can be guaranteed with high precision.

What is claimed is:

1. A gas leakage detection system, comprising:
   a flow path;
   a dual mode valve disposed in the flow path;
   an ultrasonic measuring section including a pair of ultrasonic transducers, disposed in the flow path upstream from the dual mode valve;
   a flow rate calculation section for computing a flow rate based on a signal from the ultrasonic measuring section; and
   a control section for controlling the dual mode valve,
      wherein the control section closes or opens the dual mode valve instantaneously, substantially without affecting the use of gas at a downstream side from the dual mode valve, when the flow rate in the flow path is less than or equal to a predetermined value, and the flow rate calculation section computes a flow rate when the dual mode valve is closed.

2. A gas leakage detection system according to claim 1, the flow rate calculation section calculates the flow rate after the flow rate in the flow path becomes stable after the dual mode valve is closed.

3. A gas leakage detection system according to claim 1, wherein the control section closes the dual mode valve again when a difference in the flow rate between before the dual mode valve is closed and after the dual mode valve is opened is greater than or equal to a predetermined value.

4. A gas leakage detection system according to claim 1, wherein the control section monitors a pressure of the dual mode valve after the dual mode valve is closed, using a pressure sensor disposed downstream from the dual mode valve in the flow path.

5. A gas leakage detection system comprising a flow path and a plurality of leakage decision blocks disposed in the flow path, wherein each of the plurality of leakage decision blocks includes:
a dual mode valve disposed in the flow path;
an ultrasonic measuring section including a pair of ultrasonic transducers, disposed in the flow path upstream from the dual mode valve;
a flow rate calculation section for computing a flow rate based on a signal from the ultrasonic measuring section; and
a control section for controlling the dual mode valve, wherein the control section in each of the plurality of leakage decision blocks closes or opens the dual mode valve instantaneously from an upstream side to a downstream side of the flow path, and the flow rate calculation section computes a flow rate when the dual mode valve is closed.

6. A gas leakage detection system comprising a flow path and a plurality of leakage decision blocks disposed in the flow path,
wherein each of the plurality of leakage decision blocks includes:
a dual mode valve disposed in the flow path;
an ultrasonic measuring section including a pair of ultrasonic transducers, disposed in the flow path upstream from the dual mode valve;
a flow rate calculation section for computing a flow rate based on a signal from the ultrasonic measuring section; and
a control section for controlling the dual mode valve, wherein the control section in each of the plurality of leakage decision blocks closes or opens the dual mode valve instantaneously from a downstream side to an upstream side of the flow path, and the flow rate calculation section computes a flow rate when the dual mode valve is closed.

7. A gas leakage detection system, comprising:
flow path;
a dual mode valve disposed in the flow path;
a pressure sensor disposed in the flow path upstream from the dual mode valve;
a pressure calculation section for computing a pressure based on a signal from the pressure sensor; and
a control section for controlling the dual mode valve, wherein the control section closes or opens the dual mode valve instantaneously, substantially without affecting the use of gas at a downstream side from the dual mode valve, and monitors a pressure of the dual mode valve after the dual mode valve is closed, using a second pressure sensor disposed downstream from the dual mode valve in the flow path, and the pressure calculation section computes a pressure when the dual mode valve is closed.

8. A gas leakage detection system comprising a flow path and a plurality of leakage decision blocks disposed in the flow path,
wherein each of the plurality of leakage decision blocks includes:
a dual mode valve disposed in the flow path;
a pressure sensor disposed in the flow path upstream from the dual mode valve;
a pressure calculation section for computing a pressure based on a signal from the pressure sensor; and
a control section for controlling the dual mode valve, wherein the control section in each of the plurality of leakage decision blocks closes or opens the dual mode valve instantaneously from an upstream side to a downstream side of the flow path, and the pressure calculation section computes a pressure when the dual mode valve is closed.

9. A gas leakage detection system comprising a flow path and a plurality of leakage decision blocks disposed in the flow path,
wherein each of the plurality of leakage decision blocks includes:
a dual mode valve disposed in the flow path;
a pressure sensor disposed in the flow path downstream from the dual mode valve;
a pressure calculation section for computing a pressure based on a signal from the pressure sensor; and
a control section for controlling the dual mode valve, wherein the control section in each of the plurality of leakage decision blocks closes or opens the dual mode valve instantaneously from a downstream side to an upstream side of the flow path, and the pressure calculation section computes a pressure when the dual mode valve is closed.

10. A gas leakage detection system, comprising:
a flow path;
an ultrasonic measuring section including a pair of ultrasonic transducers;
a forward dual mode valve disposed in the flow path upstream from the ultrasonic measuring section;
a backward dual mode valve disposed in the flow path downstream from the ultrasonic measuring section;
a flow rate calculation section for computing a flow rate based on a signal from the ultrasonic measuring section; and
a control section for controlling the forward dual mode valve and the backward dual mode valve, wherein the control section closes or opens the forward dual mode valve and the backward dual mode valve instantaneously, substantially without affecting the use of gas at a downstream side from the backward dual mode valve, and the flow rate calculation section computes a flow rate when the forward dual mode valve and the backward dual mode valve are closed.

11. A gas leakage detection system according to claim 10, wherein the control section closes or opens the forward dual mode valve and the backward dual mode valve instantaneously, and thereafter closes or opens the backward dual mode valve, and the flow rate calculation section computes a flow rate when the backward dual mode valve is closed.

* * * * *